(12) United States Patent
Bhatia et al.

(10) Patent No.: US 10,164,878 B2
(45) Date of Patent: Dec. 25, 2018

(54) TECHNIQUES OF SENSOR READINGS VIRTUALIZATION AND BMC FUNCTIONALITY VALIDATION

(71) Applicant: American Megatrends, Inc., Norcross, GA (US)

(72) Inventors: Anurag Bhatia, Lilburn, GA (US); Samvinesh Christopher, Suwanee, GA (US); Winston Thangapandian, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 197 days.

(21) Appl. No.: 15/247,067

(22) Filed: Aug. 25, 2016

(65) Prior Publication Data

US 2018/0062989 A1    Mar. 1, 2018

(51) Int. Cl.
*G06F 15/173*    (2006.01)
*H04L 12/721*    (2013.01)

(52) U.S. Cl.
CPC .................................. *H04L 45/68* (2013.01)

(58) Field of Classification Search
CPC ...... H04L 41/04; H04L 41/24; H04L 41/0806; H04L 41/0853
USPC ......................................................... 709/223
See application file for complete search history.

(56) References Cited

U.S. PATENT DOCUMENTS

2015/0355651 A1\* 12/2015 Balakrishnan ......... G05B 15/02
                                                                    700/299

\* cited by examiner

*Primary Examiner* — Benjamin M Thieu
*Assistant Examiner* — Andrew Woo
(74) *Attorney, Agent, or Firm* — Locke Lord LLP; Tim Tingkang Xia, Esq.

(57) ABSTRACT

In an aspect of the disclosure, a method, a computer-readable medium, and a computer system are provided. A first device of the computer system emulates one or more sensors monitoring one or more operating characteristics of a host of a BMC of the computer system. The first device generates first data of a first sensor of the one or more emulated sensors. The first sensor monitors a first operating characteristic of the one or more operating characteristics. The first device sends, to the BMC, the first data and an indication indicating that the first data is associated with the first sensor.

14 Claims, 5 Drawing Sheets

TECHNIQUES OF SENSOR READINGS VIRTUALIZATION AND BMC FUNCTIONALITY VALIDATION

BACKGROUND

Field

The present disclosure relates generally to computer systems, and more particularly, to techniques of emulating sensors and sensor readings of a host for validating functionalities of a baseboard management controller (BMC) managing the host.

Background

Considerable developments have been made in the arena of server management. An industry standard called Intelligent Platform Management Interface (IPMI), described in, e.g., "IPMI: Intelligent Platform Management Interface Specification, Second Generation," v. 2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc. A BMC may be considered as an embedded-system device.

In certain circumstances, with respect to an embedded management system (e.g., an IPMI based system), the overall management solution cannot be validated until a hardware design of a host, which includes sensors etc., becomes available. This means that the actual sensor readings, the events or responses generated based on the sensor readings, and the overall system response can only be seen and validated after the actual hardware is available and powered on. If there are any issues found in the embedded management system or the system needs changes, the hardware needs to be redone. This may be not optimal.

Therefore, there is a need for a mechanism that provides a user interface based method to allow the system designers to virtualize the target hardware platform by simulating sensors and sensor readings without accessing to the hardware platform.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. A first device of the computer system emulates one or more sensors monitoring one or more operating characteristics of a host of a BMC of the computer system. The first device generates first data of a first sensor of the one or more emulated sensors. The first sensor monitors a first operating characteristic of the one or more operating characteristics. The first device sends, to the BMC, the first data and an indication indicating that the first data is associated with the first sensor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In certain circumstances, with respect to an embedded management system (e.g., an IPMI based system), the overall management solution cannot be validated until a hardware design of a host, which includes sensors etc., becomes available. This means that the actual sensor readings, the events or responses generated based on the sensor readings, and the overall system response can only be seen and validated after the actual hardware is available and powered on. If there are any issues found in the embedded management system or the system needs changes, the hardware needs to be redone. This may be not optimal.

Therefore, there is a need for a mechanism that provides a user interface based method to allow the system designers to virtualize the target hardware platform by simulating sensors and sensor readings without accessing to the hardware platform.

The present disclosure discloses such a mechanism. In the disclosed mechanism, the complete hardware platform with all its devices can be simulated, and readings of the sensors/devices can be changed dynamically. The events generated as a result of these simulated values can be used to verify the overall system functionality and the expected system behavior.

The mechanism may include a graphical user interface (GUI) based tool, which runs as a client communicating with an operating service processor/BMC to obtain the run-time results. The client feeds the simulated sensor readings to the management system of the service processor/BMC. The management system may further operate in a simulator mode (an emulation mode), in which the management system obtains the sensor readings from the client and not from the actual physical sensors.

The disclosed mechanism may enable faster system development. Simulating the actual hardware platform including the devices/sensors and running real-time simulated values on the devices/sensors may offer advantageously the ability to verify the overall system behavior without having to wait for the hardware to become physically available. As such, the hardware development of the host and the firmware development of the service processor/BMC can be conducted in parallel, thus reducing the overall system development time.

The disclosed mechanism may also reduce the hardware development cost. The total hardware development cost can be reduced, as some or all real-time situations can be applied (simulated) in this mechanism. The issues potentially encountered and the changes needed in the hardware can therefore be identified by using the mechanism. The consolidated list of all hardware changes can be applied together to revise the hardware, as needed. This may reduce the number of hardware revisions.

Figure 1:
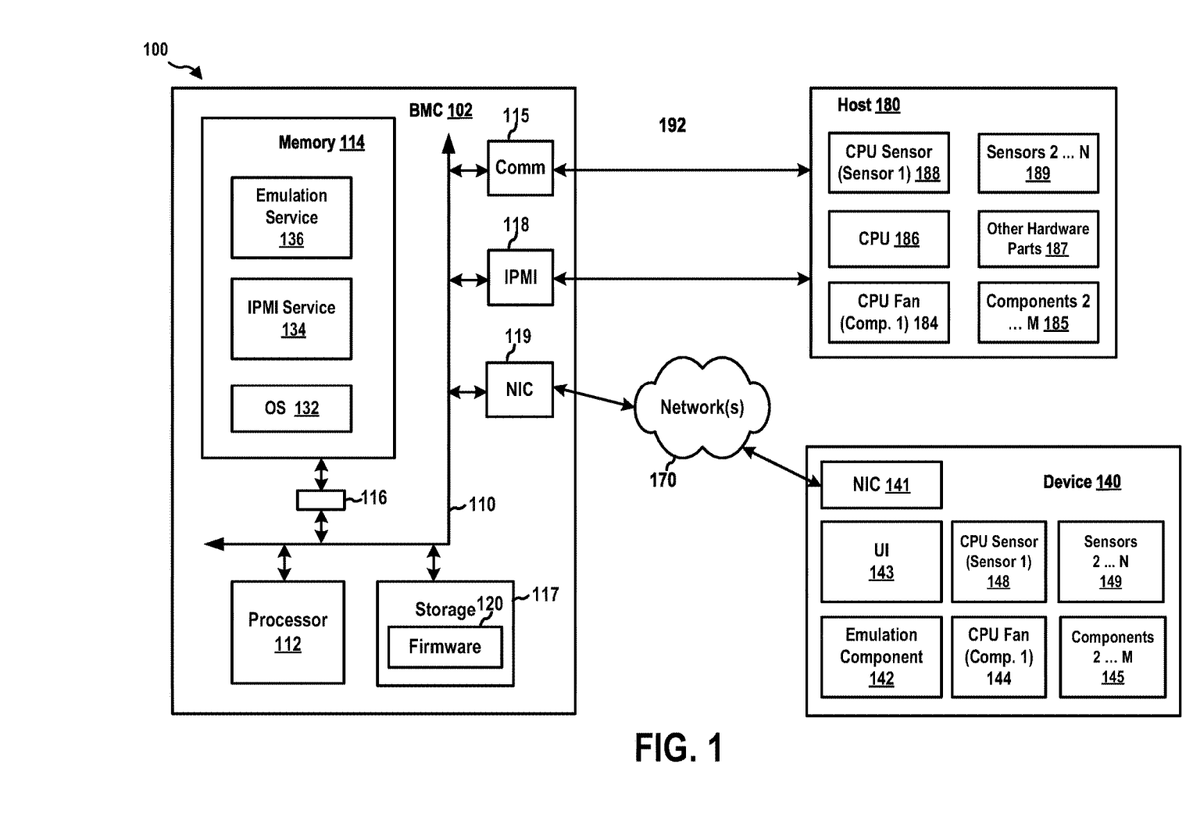
FIG. 1 is a diagram illustrating a computer system.

FIG. 1 is a diagram 100 illustrating a computer system. In this example, the computer system includes, among other devices, a BMC 102, a host computer 180, and an emulation device 140.

The BMC 102 has a processor 112, a memory 114, a memory driver 116, a storage 117, communication interface(s) 115, and a network interface card 119. Further, the BMC 102 may support IPMI and may have an IPMI interface 118. The IPMI interface 118 may be implemented over the communication interface(s) 115, which may include a keyboard controller style (KCS), a server management interface chip (SMIC), a block transfer (BT) interface, a system management bus system interface (SSIF), a Universal Serial Bus (USB) interface, a network interface (e.g., the network interface card 119), and/or other suitable communication interface(s). The memory 114, the processor 112, the memory driver 116, the storage 117, the communication interface(s) 115, the network interface card 119, and the IPMI interface 118 may be in communication with each other through a communication channel 110 such as a bus architecture.

The BMC 102 may store BMC firmware 120 in the storage 117. When the processor 112 executes the BMC firmware 120, the processor 112 loads code and data of the BMC firmware 120 into the memory 114. This example shows that the BMC firmware 120 provides in the memory 114, among other components, an operating system (OS) 132, an IPMI service 134, and an emulation service 136. As described supra, the IPMI service 134 may receive and send IPMI messages through the IPMI interface 118. The emulation service 136 may facilitate communication with the emulation device 140.

The BMC 102 may be in communication, through the communication interface(s) 115 and/or the IPMI interface 118, with the host computer 180. The BMC 102 may manage the host computer 180. The host computer 180 may include, among other components, a CPU temperature sensor 188, sensors 2 to N 189, a CPU fan 184, and hardware components 2 to M 185, which are managed by the BMC 102. The host computer 180 may also include a host CPU 186 and other hardware parts 187 that are not directly managed by the BMC 102.

The CPU temperature sensor 188 and the sensors 2 to N 189 are hardware components and measure such operating characteristics as temperature, current, voltage, power supplies, fans, memory, or any other appropriate operating parameters that affects performance. For instance, the CPU temperature sensor 188 monitors the temperature of the host CPU 186. The sensors 2 to N 189 may monitor voltage levels of the host computer 180, temperature levels for the host computer 180, cooling fan presence and operation, physical hard disk drive presence and operation, and/or errors in memory, etc.

The CPU temperature sensor 188 and the sensors 2 to N 189 may be linear, non-linear, discrete, or threshold sensors. Linear sensors return sensor values that can be converted to the desired sensor units, such as temperature or voltage, using a linear conversion formula. Non-linear sensors cannot be linearized using one of the predetermined linearization formula or do not have constant conversion factors over the range of sensor values. Discrete physical sensors have sensor values that consist of a number of individual states. Threshold physical sensors have sensor values that include a current sensor reading and any associated thresholds for the physical sensor.

Further, the CPU fan 184 and hardware components 2 to M 185 may be operated, e.g., under the management of the BMC 102, to adjust the one or more operating characteristics of the host computer 180. For example, the CPU fan 184 may be operated to adjust the temperature of the host CPU 186.

The communications between the BMC 102 and the emulation device 140 may be carried over a network 170 (e.g., a local area network (LAN)). In this example, the BMC 102 may be in communication with the network 170 through the network interface card 119.

The emulation device 140 may include a network interface card 141, through which the emulation device 140 is connected to the network 170. The emulation device 140 also includes an emulation component 142. The emulation component 142 may emulate hardware components and sensors of a host. In this example, the emulation component 142 emulates the CPU temperature sensor 188 and the sensors 2 to N 189 (which are physical sensors) to constructs an emulated CPU temperature sensor 148 and emulated sensors 2 to N 149. Further, in certain configurations, the emulation component 142 may optionally emulate the CPU fan 184 and the hardware components 2 to M 185 (which are physical hardware components) to construct an emulated CPU fan 144 and emulated hardware components 2 to M 145. The emulation device 140 may also include a user interface 143.

In certain configurations, the emulation component 142 may, based on pre-configured logics, generate and set sensor readings for the emulated CPU temperature sensor 148 and the emulated sensors 2 to N 149. In certain configurations, the emulation component 142 may receive instructions from a user through the user interface 143. The instructions include the sensor readings for one or more of the emulated CPU temperature sensor 148 and the emulated sensors 2 to N 149. As such, the emulation component 142 generates and sets the sensor readings for the one or more of the emulated CPU temperature sensor 148 and the emulated sensors 2 to N 149 accordingly.

In this example, the emulation component 142 sets a sensor reading (e.g., 70° C.) for the emulated CPU temperature sensor 148. The emulated CPU temperature sensor 148 accordingly generates sensor data to represent the sensor reading of this sensor. The emulated CPU temperature sensor 148 then sends the sensor data and an indication of the associated sensor (i.e., the emulated CPU temperature sensor 148) to the BMC 102. In particular, the emulated CPU temperature sensor 148 may construct a device message (e.g., a packet in a predetermined format) including the sensor data and the indication, and may send the message to the BMC 102 through the network interface card 141.

At the BMC 102, the emulation service 136 receives the message (e.g., through the network interface card 119). The emulation service 136 extracts the sensor data and the indication from the message, and accordingly may store locally the sensor data as associated with the emulated CPU temperature sensor 148.

The emulation service 136 may set (e.g., based on user instructions) the BMC 102 to operate in an emulation mode or a normal mode. When the BMC 102 operates in the emulation mode, the IPMI service 134 obtains sensor data from the emulation service 136. When the BMC 102 operates in the normal mode, the IPMI service 134 obtains sensor data from the physical sensors of the host computer 180 or from a Sensor Data Record (SDR), which is a repository stores actual sensor data obtained from the physical sensors of the host computer 180. In particular, the IPMI service 134 may communicate with the CPU temperature sensor 188 and the sensors 2 to N 189 through the IPMI interface 118 and using IPMI messages.

In this example, the BMC 102 operates in the emulation mode. The IPMI service 134 obtains sensor data of the emulated CPU temperature sensor 148 and the emulated sensors 2 to N 149, which are provided by the emulation device 140, as if those data are obtained from the CPU temperature sensor 188 and the sensors 2 to N 189 of the host computer 180. The IPMI service 134 processes the sensor data and may determine to generate a response (or an event) based on the sensor data.

In the emulation mode, the BMC 102 may further operate in a with-hardware submode or a no-hardware submode. In the with-hardware submode, the BMC 102 is in communication with the host computer 180. The response generated by the IPMI service 134 may include an operation to be performed by one or more of the CPU fan 184 and hardware components 2 to M 185. For example, when the sensor reading received from the emulated CPU temperature sensor 148 is above a threshold (e.g., 50° C.), the operation may be increasing the speed of the CPU fan 184 (e.g., to a first speed). Accordingly, the IPMI service 134 may construct an IPMI message instructing the CPU fan 184 to increase the speed, and may send the IPMI message to the CPU fan 184 through the IPMI interface 118. The operation of the target hardware component and/or the target operating characteristic (e.g., the CPU temperature) can be monitored at the host computer 180. As such, it can be determined whether the IPMI service 134 is functioning properly to manage the target operating characteristics of the host computer 180. For example, the CPU fan 184 at the increased speed (e.g., at the first speed) may not be able to lower the temperature of the host CPU 186 to a desirable range. Accordingly, the IPMI service 134 may be modified such that, when receiving the same CPU temperature (e.g., 70° C.) from the emulated CPU temperature sensor 148, the IPMI service 134 generates a response that increase the speed of the CPU fan 184 even higher (e.g., to a second speed that is higher than the first speed).

In the no-hardware submode, the BMC 102 is not in communication with the host computer 180. The response generated by the IPMI service 134 may include an operation of one or more of the emulated CPU fan 144 and the emulated hardware components 2 to M 145. For example, when the sensor reading received from the emulated CPU temperature sensor 148 is above a threshold, the operation may be increasing the speed of the emulated CPU fan 144

(e.g., to a first speed). Accordingly, the IPMI service 134 may construct a device message (e.g., in a format recognizable by the emulation device 140) instructing the emulated CPU fan 144 to increase the speed, and may send the device message to the emulated CPU fan 144 through the IPMI interface 118. The operation of the target hardware component (e.g., the emulated CPU fan 144) and/or the target operating characteristic (e.g., the CPU temperature) can be emulated at the emulation device 140. As such, it can be determined whether the IPMI service 134 is functioning properly to manage the target operating characteristics of the emulated host (e.g., which is emulating the host computer 180). For example, the emulation or simulation may show that emulated CPU fan 144 at the increased speed may not be able to lower the temperature of the emulated CPU to a desirable range. Accordingly, the IPMI service 134 may be modified such that, when receiving the same CPU temperature (e.g., 70° C.) from the emulated CPU temperature sensor 148, the IPMI service 134 generates a response that increase the speed of the emulated CPU fan 144 even higher (e.g., to a second speed that is higher than the first speed).

In both submodes, the emulation service 136 at the BMC 102 may also obtain the response generated by the IPMI service 134, and may send information of the response to the emulation component 142 at the emulation device 140 (e.g., via the network interface card 119). The emulation component 142 may determine, e.g., based on certain predetermined rules, whether the response is proper. The emulation component 142 may also instruct the user interface 143 to display the response and, in particular, the requested operation (e.g., increasing the fan speed of the CPU fan 184 to the second speed) directed to the target hardware component. A user may review the response and may determine whether the response is proper. In the no-hardware submode, the user interface 143 may also display the operations of the emulated hardware components and the emulated operating characteristics.

Figure 2:
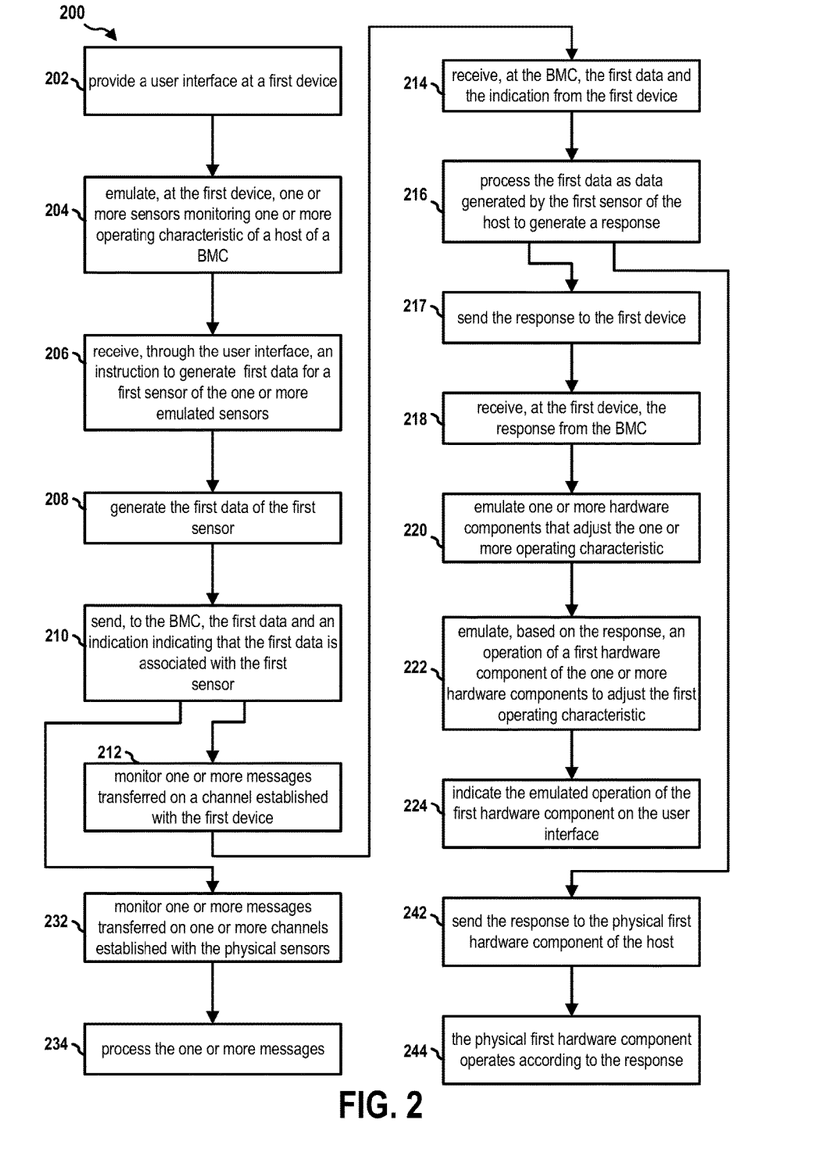
FIG. 2 is a flow chart of a method (process) for emulating sensors and sensor readings.

FIG. 2 is a flow chart 200 of a method (process) for emulating sensors and sensor readings. The method may be performed by a BMC (e.g., the BMC 102, the apparatus 102') and a first device (e.g., the emulation device 140, the apparatus 140') of a computer system.

At operation 202, the first device provides a user interface (e.g., the user interface 143). At operation 204, the first device emulates one or more sensors (e.g., the CPU temperature sensor 188, the emulated CPU temperature sensor 148) monitoring one or more operating characteristics (e.g., CPU temperature) of a host (e.g., the host computer 180) of a BMC. At operation 206, the first device receives, through the user interface, an instruction to generate first data for a first sensor (the emulated CPU temperature sensor 148) of the one or more emulated sensors. The first sensor monitors a first operating characteristic of the one or more operating characteristics. At operation 208, the first device generates the first data of the first sensor. At operation 210, the first device sends, to the BMC, the first data and an indication indicating that the first data is associated with the first sensor (e.g., via the device message).

The BMC can determine, e.g., based on an instruction (through the user interface 143), to receive data from the one or more emulated sensors or from physical sensors monitoring the hardware of the host. When the BMC has determined to receive data from the one or more physical sensors, the BMC, at operation 232, monitors one or more messages (e.g., IPMI messages) transferred on one or more channels (e.g., via the communication interface(s) 115) established with the physical sensors. Subsequently, at operation 234, the BMC processes the one or more messages.

When the BMC has determined to receive data from the one or more emulated sensors, the BMC, at operation 212, monitors one or more messages (e.g., the device messages) transferred on a channel established with the first device (e.g., via the network interface card 119 and the network interface card 141). Subsequently, at operation 214, the BMC receives the first data and the indication from the first device. At operation 216, the BMC processes the first data as data generated by the first sensor of the host to generate a response.

The response may indicate an operation of a physical first hardware component (e.g., the CPU fan 184) or an emulated first hardware component (e.g., the emulated CPU fan 144) of the host to adjust the first operating characteristic (e.g., the CPU temperature) of the host. When the response indicates the operation of the emulated first hardware component (e.g., increasing the fan speed of the emulated CPU fan 144), the BMC, at operation 217, sends the response to the first device. At operation 218, the first device receives the response from the BMC. At operation 220, the first device continues to emulate one or more hardware components that adjust the one or more operating characteristics. At operation 222, the first device may emulate, based on the response, an operation of a first hardware component (e.g., the emulated CPU fan 144) of the one or more hardware components to adjust the first operating characteristic. At operation 224, the first device indicating the emulated operation of the first hardware component on the user interface.

When the response of operation 216 indicates the operation of the physical first hardware component (e.g., increasing the fan speed of the CPU fan 184), the BMC, at operation 242, sends the response to the physical first hardware component of the host. Subsequently, at operation 244, the physical first hardware component operates according to the response.

Figure 3:
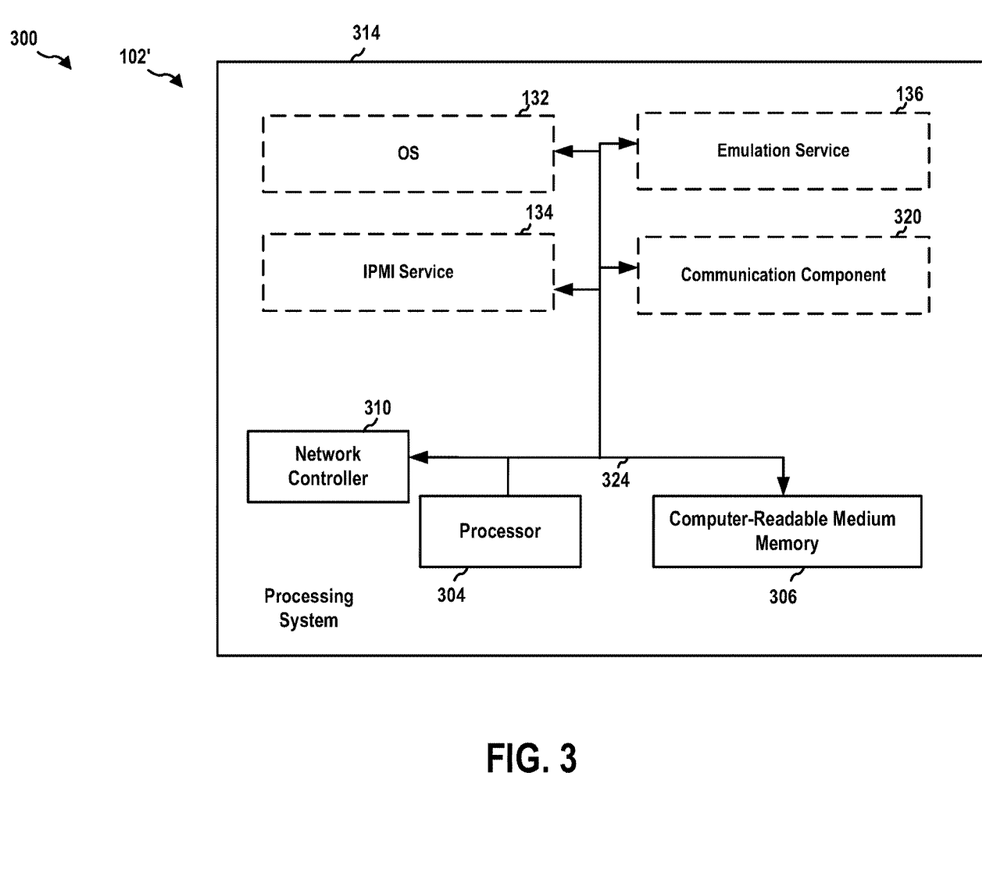
FIG. 3 is a diagram illustrating an example of a hardware implementation for an apparatus employing a processing system.

FIG. 3 is a diagram 300 illustrating an example of a hardware implementation for an apparatus 102' employing a processing system 314. The apparatus 102' may implement the BMC 102. The processing system 314 may be implemented with a bus architecture, represented generally by the bus 324. The bus 324 may include any number of interconnecting buses and bridges depending on the specific application of the processing system 314 and the overall design constraints. The bus 324 links together various circuits including one or more processors and/or hardware components, represented by the processor 304, the OS 132, the IPMI service 134, the emulation service 136, and the computer-readable medium/memory 306. In particular, the computer-readable medium/memory 306 may include the memory 114 and the storage 117. The bus 324 may also link various other circuits such as timing sources, peripherals, voltage regulators, and power management circuits, which are well known in the art, and therefore, will not be described any further.

The processing system 314 may be coupled to a network controller 310. The network controller 310 provides a means for communicating with various other apparatus over a network. The network controller 310 receives a signal from the network, extracts information from the received signal, and provides the extracted information to the processing system 314, specifically a communication component 320 of the apparatus 102'. In addition, the network controller 310 receives information from the processing system 314, specifically the communication component 320, and based on the received information, generates a signal to be sent to the network. The processing system 314 includes a processor 304 coupled to a computer-readable medium/memory 306. The processor 304 is responsible for general processing, including the execution of software stored on the computer-readable medium/memory 306. The software, when executed by the processor 304, causes the processing system 314 to perform the various functions described supra for any particular apparatus. The computer-readable medium/memory 306 may also be used for storing data that is manipulated by the processor 304 when executing software. The processing system further includes at least one of the OS 132, the IPMI service 134, the emulation service 136. The components may be software components running in the processor 304, resident/stored in the computer readable medium/memory 306, one or more hardware components coupled to the processor 304, or some combination thereof.

The apparatus 102' may be configured to include means for performing certain operations (e.g., operations 212, 214, 216, 217, 232, 234, 242) described supra referring to FIG. 2. The aforementioned means may be one or more of the aforementioned components of the apparatus 102 and/or the processing system 314 of the apparatus 102' configured to perform the functions recited by the aforementioned means.

Figure 4:
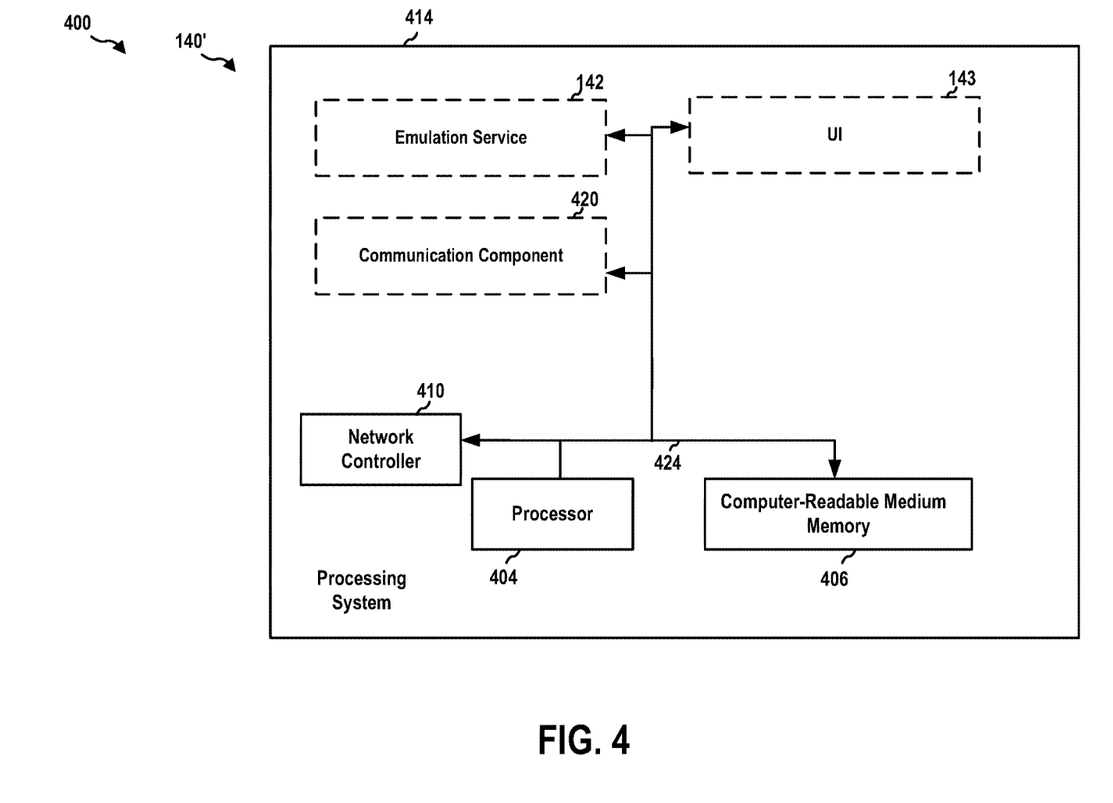
FIG. 4 is a diagram illustrating an example of a hardware implementation for another apparatus employing a processing system.

FIG. 4 is a diagram 400 illustrating an example of a hardware implementation for an apparatus 140' employing a processing system 414. The apparatus 140' may implement the emulation device 140. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware components, represented by the processor 404, the emulation component 142, the user interface 143, and the computer-readable medium/memory 406. The bus 424 may also link various other circuits such as timing sources, peripherals, voltage regulators, and power management circuits, which are well known in the art, and therefore, will not be described any further.

The processing system 414 may be coupled to a network controller 410. The network controller 410 provides a means for communicating with various other apparatus over a network. The network controller 410 receives a signal from the network, extracts information from the received signal, and provides the extracted information to the processing system 414, specifically a communication component 420 of the apparatus 140'. In addition, the network controller 410 receives information from the processing system 414, specifically the communication component 420, and based on the received information, generates a signal to be sent to the network. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of the emulation component 142, the user interface 143. The components may be software components running in the processor 404, resident/stored in the computer readable medium/memory 406, one or more hardware components coupled to the processor 404, or some combination thereof.

The apparatus 140' may be configured to include means for performing certain operations (e.g., operations 202, 204, 206, 208, 210, 218, 220, 222, 224) described supra referring to FIG. 2. The aforementioned means may be one or more of the aforementioned components of the apparatus 140 and/or the processing system 414 of the apparatus 140' configured to perform the functions recited by the aforementioned means.

Figure 5:
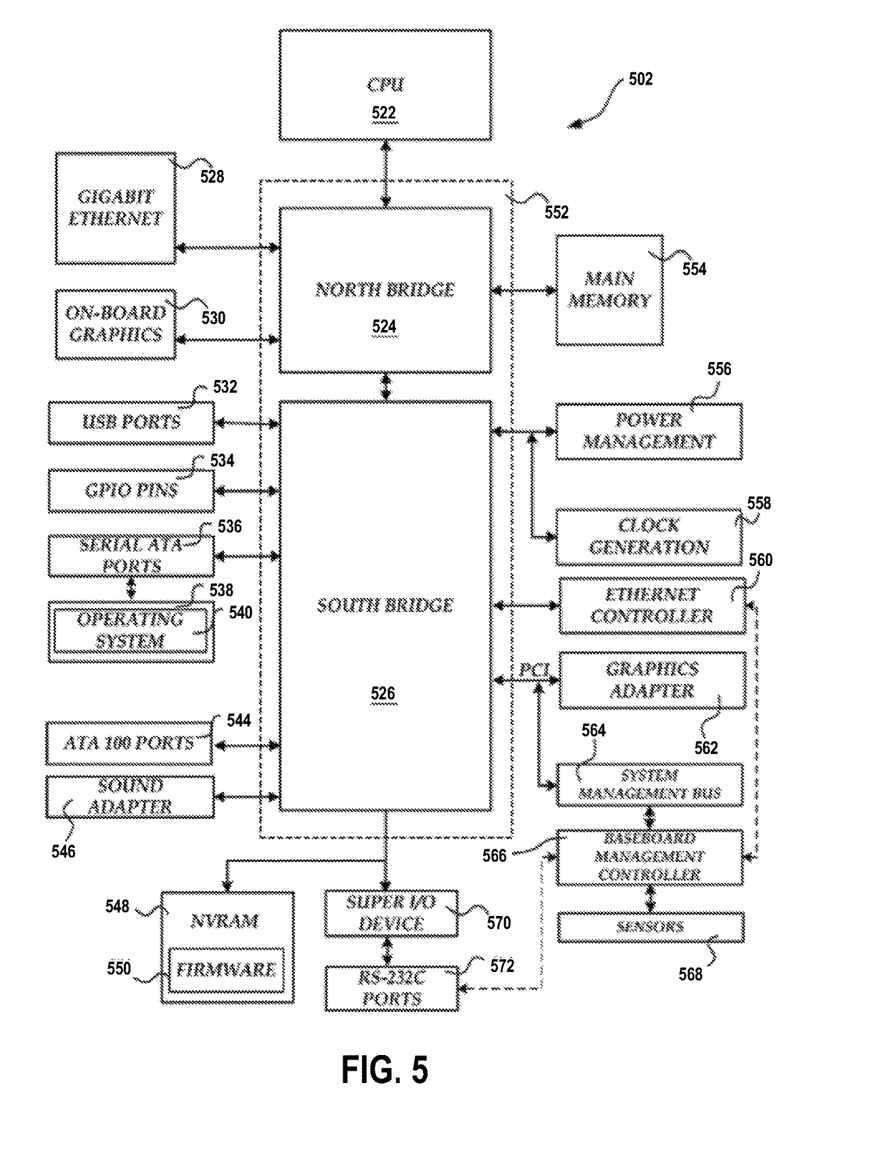
FIG. 5 shows a computer architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 180, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the BMC 102. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including handheld computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It should also be appreciated that the computer 502 may comprise other types of computing devices, including handheld computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, comprising:
   emulating, at a first device of the computer system, one or more sensors monitoring one or more operating characteristics of a host of a baseboard management controller (BMC), wherein the computer system includes the BMC;
   generating first data of a first sensor of the one or more emulated sensors, the first sensor monitoring a first operating characteristic of the one or more operating characteristics; and
   sending, to the BMC, the first data and an indication indicating that the first data is associated with the first sensor;
   receiving, at the BMC, the first data and the indication from the first device;
   processing the first data as data generated by the first sensor of the host to generate a response, wherein the response indicates an operation of a physical first hardware component or an emulated first hardware component of the host to adjust the first operating characteristic of the host;
   sending the response to the physical first hardware component of the host when the response indicates the operation of the physical first hardware component;
   sending the response to the first device when the response indicates the operation of the emulated first hardware component;
   receiving, at the first device or at the host, the response from the BMC; and
   determining whether a component of the BMC is functioning properly based on the response.

2. The method of claim 1, further comprising:
   receiving, at the first device, the response from the BMC;
   emulating one or more hardware components that adjust the one or more operating characteristics; and
   emulating, based on the response, an operation of a first hardware component of the one or more hardware components to adjust the first operating characteristic.

3. The method of claim 2, further comprising:
   providing a user interface at the first device; and
   receiving, through the user interface, an instruction to generate the first data for the first sensor.

4. The method of claim 3, further comprising indicating the emulated operation of the first hardware component on the user interface.

5. The method of claim 1, further comprising:
   determining, by the BMC based on an instruction, to receive data from the one or more emulated sensors or from the one or more physical sensors of the host;
   monitoring one or more messages transferred on a channel established with the first device when the BMC has determined to receive data from the one or more emulated sensors; and
   monitoring one or more messages transferred on one or more channels established with the one or more physical sensors when the BMC has determined to receive data from the one or more physical sensors.

6. A computer system, comprising:
   a baseboard management controller (BMC);
   a memory; and
   at least one processor coupled to the memory and configured to:
   emulate, at a first device of the computer system, one or more sensors monitoring one or more operating characteristics of a host of the BMC;
   generate first data of a first sensor of the one or more emulated sensors, the first sensor monitoring a first operating characteristic of the one or more operating characteristics;
   send, to the BMC, the first data and an indication indicating that the first data is associated with the first sensor;
   receive, at the BMC, the first data and the indication from the first device;
   process the first data as data generated by the first sensor of the host to generate a response, wherein the response indicates an operation of a physical first hardware component or an emulated first hardware component of the host to adjust the first operating characteristic of the host;
   send the response to the physical first hardware component of the host when the response indicates the operation of the physical first hardware component;
   send the response to the first device when the response indicates the operation of the emulated first hardware component;
   receive, at the first device or at the host, the response from the BMC; and
   determine whether a component of the BMC is functioning properly based on the response.

7. The computer system of claim 6, wherein the at least one processor is further configured to:
   receive, at the first device, the response from the BMC;
   emulate one or more hardware components that adjust the one or more operating characteristics; and emulate, based on the response, an operation of a first hardware component of the one or more hardware components to adjust the first operating characteristic.

8. The computer system of claim 7, wherein the at least one processor is further configured to:
   provide a user interface at the first device; and
   receive, through the user interface, an instruction to generate the first data for the first sensor.

9. The computer system of claim 8, wherein the at least one processor is further configured to indicate the emulated operation of the first hardware component on the user interface.

10. The computer system of claim 8, wherein the at least one processor is further configured to:
    determine, by the BMC based on an instruction, to receive data from the one or more emulated sensors or from the one or more physical sensors of the host;

monitor one or more messages transferred on a channel established with the first device when the BMC has determined to receive data from the one or more emulated sensors; and monitor one or more messages transferred on one or more channels established with the one or more physical sensors when the BMC has determined to receive data from the one or more physical sensors.

11. A non-transitory computer-readable medium storing computer executable code for operating a computer system, comprising code to:

emulate, at a first device of the computer system, one or more sensors monitoring one or more operating characteristics of a host of a baseboard management controller (BMC), wherein the computer system includes the BMC;

generate first data of a first sensor of the one or more emulated sensors, the first sensor monitoring a first operating characteristic of the one or more operating characteristics;

send, to the BMC, the first data and an indication indicating that the first data is associated with the first sensor;

receive, at the BMC, the first data and the indication from the first device; and process the first data as data generated by the first sensor of the host to generate a response, wherein the response indicates an operation of a physical first hardware component or an emulated first hardware component of the host to adjust the first operating characteristic of the host;

send the response to the physical first hardware component of the host when the response indicates the operation of the physical first hardware component; and send the response to the first device when the response indicates the operation of the emulated first hardware component;

receive, at the first device or at the host, the response from the BMC; and determine whether a component of the BMC is functioning properly based on the response.

12. The non-transitory computer-readable medium of claim 11, wherein the code is further configured to:

receive, at the first device, the response from the BMC;

emulate one or more hardware components that adjust the one or more operating characteristics; and emulate, based on the response, an operation of a first hardware component of the one or more hardware components to adjust the first operating characteristic.

13. The non-transitory computer-readable medium of claim 12, wherein the code is further configured to:

provide a user interface at the first device; and receive, through the user interface, an instruction to generate the first data for the first sensor.

14. The non-transitory computer-readable medium of claim 13, wherein the code is further configured to indicate the emulated operation of the first hardware component on the user interface.

* * * * *